(12) United States Patent
Krishnakumar et al.

(10) Patent No.: US 6,855,289 B2
(45) Date of Patent: Feb. 15, 2005

(54) METHOD AND APPARATUS FOR COOLING DURING IN-MOLD HANDLE ATTACHMENT

(75) Inventors: Suppayan M. Krishnakumar, Nashua, NH (US); David Piccioli, Auburn, NH (US)

(73) Assignee: Graham Packaging PET Technologies, Inc., York, PA (US)

( * ) Notice: Subject to any disclaimer, the term of this patent is extended or adjusted under 35 U.S.C. 154(b) by 396 days.

(21) Appl. No.: 09/994,555

(22) Filed: Nov. 27, 2001

(65) Prior Publication Data
US 2003/0098526 A1 May 29, 2003

(51) Int. Cl.[7] .......................... B29C 49/20; B29C 49/66
(52) U.S. Cl. ....................... 264/516; 264/520; 264/521; 264/528; 264/532
(58) Field of Search ................................ 264/516, 520, 264/521, 528, 532

(56) References Cited

U.S. PATENT DOCUMENTS

| | | | |
|---|---|---|---|
| 4,128,383 A | 12/1978 | Bond | 425/529 |
| 4,863,046 A | 9/1989 | Collette et al. | 215/1 |
| 5,182,122 A | 1/1993 | Uehara | 425/526 |
| 5,338,503 A * | 8/1994 | Yanagisawa et al. | 264/516 |
| 5,520,877 A | 5/1996 | Collette et al. | 264/521 |
| 5,533,881 A | 7/1996 | Collette et al. | 425/525 |
| 5,704,503 A | 1/1998 | Krishnakumar et al. | 215/381 |
| 6,012,597 A | 1/2000 | Nishihara et al. | 215/398 |
| 6,179,143 B1 | 1/2001 | Grob | 215/398 |
| 6,444,158 B1 * | 9/2002 | Grob et al. | 264/516 |

FOREIGN PATENT DOCUMENTS

| | | | |
|---|---|---|---|
| JP | 04138241 | 5/1992 | B29C/49/20 |
| JP | 05261799 | 10/1993 | B29C/49/08 |
| JP | 07068629 | 3/1995 | B29C/49/20 |
| JP | 08300452 | 11/1996 | B29C/49/20 |
| WO | WO 97/43108 | 11/1997 | |

OTHER PUBLICATIONS

European Search Report, mailed Mar. 11, 2003 for EP 02 02 6174.9.

* cited by examiner

Primary Examiner—Suzanne E. McDowell
(74) Attorney, Agent, or Firm—Finnegan, Henderson, Farabow, Garrett & Dunner, LLP

(57) ABSTRACT

Method and apparatus for in-mold handle attachment, wherein a portion of a blow-molded container is formed about a retaining member on a handle during blow molding. After forming the container portion about the retaining member, a cooling medium is directed at the location of the container portion in order to accelerate the cooling rate at the container portion. There is achieved at least one of an improvement in the security of the attachment of the handle to the container, and a reduction in the blow-mold processing time.

22 Claims, 5 Drawing Sheets

METHOD AND APPARATUS FOR COOLING DURING IN-MOLD HANDLE ATTACHMENT

DESCRIPTION OF THE INVENTION

1. Field of the Invention

This invention relates to handled plastic containers, wherein a handle is separately formed and then connected to a container during the container blow-molding process, and more particularly to an apparatus and method for cooling the handle attachment portion(s) to improve one or more of the efficiency of the blow-molding process and the integrity of the handle attachment.

2. Background of the Invention

Plastic containers for holding liquids such as beverages, and other household items such as detergents, are in widespread use. Plastics such as polyethylene terephthalate (PET) can offer lightweight convenience, durability and transparency.

Larger-sized plastic containers, such as one- or two-liter plastic containers, are typically provided with a handle for ease of pouring. However, because of the increased weight of such larger-sized containers, achieving secure handle attachment is difficult. Also, a special mold is required in the production of such bottles, as they are more difficult to blow mold than a non-handled bottle, e.g., difficulties arise with stress concentrations leading to possible container failure in areas near the junction of the handle with the rest of the container.

Various attempts have been made to attach separate handles to blow-molded containers formed from preforms, but these attachment methods may not be successful in all applications. In one method, a handle is connected to a plastic container by blow molding the walls of the container around retaining portions provided at opposing ends of the handle. This method is described for example in PCT Publication WO97/43108 published 20 Nov. 1997 and assigned to Continental PET Technologies, Inc. In general, the goals are to attach a separate handle to a plastic blow-molded container by a method which enables relatively simple and rapid manufacture and which method leads to the production of a handled bottle having the handle firmly secured in position.

SUMMARY OF THE INVENTION

In accordance with the present invention, an apparatus and method are provided which allow enhanced in-mold cooling of select locations of a blow-molded container by directing a cooling medium at those locations. More specifically, the selected locations are those portion(s) of the blow-molded container which engage retaining member(s) on the handle during the blow-molding process.

In one embodiment, a method of in-mold handle attachment is provided wherein a portion of the blow-molded container is formed about a retaining member on the handle during blow molding. After forming the container portion about the retaining member, a cooling medium is directed at the location of the container portion formed about the retaining member in order to accelerate the cooling rate at that portion. In a more specific embodiment, the step of blow molding includes injecting a pressurized medium (e.g., air) to form the blow-molded container and hold the container in contact with the mold cavity walls, followed by injecting a cooling medium at select locations and enabling a partial exhaust to promote air flow of the cooling medium at the select container locations, while still maintaining the expanded container in contact with the mold cavity walls. For example, the mold cavity walls may be heated in order to thermally condition the container where the intended use is as a hot-fill container.

One benefit of this method of in-mold handle attachment is a reduction in the time for cooling of the blow-molded container within the mold cavity. In spite of this reduction in cooling time and resultant reduction in overall blow-molding process time, the integrity of the handle attachment is maintained and preferably improved by insuring that the container portion(s) formed about the retaining member(s) on the handle are sufficiently rigidified prior to removal of the finished container from the mold to ensure secure handle attachment.

In another embodiment, an improved blow-molding apparatus is provided, which includes a new type of stretch rod for the blow-molding cavity. The stretch rod has at least one port for directing a cooling medium against a select portion of the blow-molded container formed in the blow-molding cavity. Preferably, the at least one port directs a cooling medium at the one or more portions of the molded container formed about one or more retaining members on the handle. The blow-molding apparatus may further include a partial exhaust circuit to enhance a flow of the cooling medium in the blow-molding cavity.

In another embodiment, an improved stretch rod is provided for use in a blow-molding cavity. The stretch rod includes at least one port for directing a cooling medium into the blow-molding cavity, in order to direct cooling air at select portions of the container being formed about one or more retaining members on the handle.

These and other features of the present invention will be understood from the following detailed description and drawings.

DETAILED DESCRIPTION

One embodiment of the present invention will now be described for blow-molding a one-gallon hot-fillable PET container. A prior art blow molding process for making such a container will first be described for purposes of comparison. Additional aspects of a process for making a hot-fillable container are described in U.S. Pat. No. 4,863,046 issued 5 Sep. 1989 to Collette et al. and U.S. Pat. No. 5,704,503 issued 6 Jan. 1998 to Krishnakumar et al., each of which are hereby incorporated by reference in their entirety.

Figure 1:
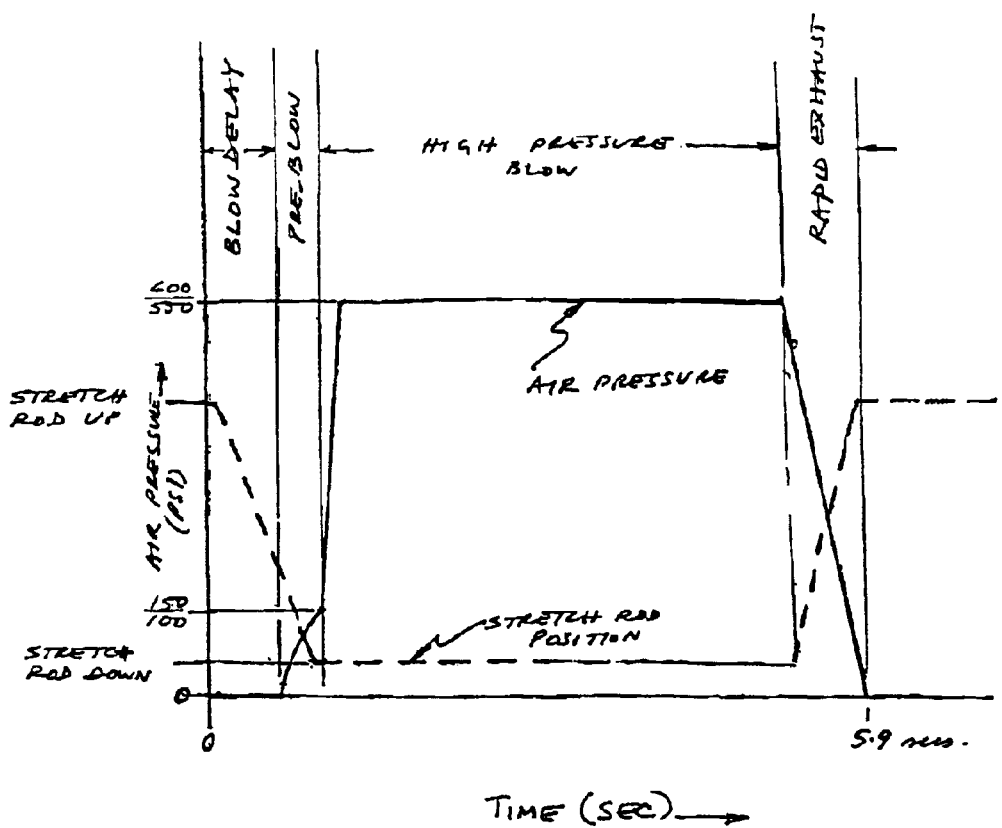
FIG. 1 is a graph of air pressure and stretch rod position on the Y axis, versus time on the X axis, for a prior art blow-molding process.

FIG. 1 is a graph illustrating a prior art blow-molding process for making a one-gallon PET container. On the vertical Y axis is indicated both the air pressure in psi within the blow mold, and the relative stretch rod position (up and down) in the blow mold. On the horizontal X axis is time in seconds. The graph illustrates one cycle of the blow-molding process. During this cycle a container would be blow-molded from a preform in a blow-molding cavity similar to that shown in FIGS. 3–4.

There are essentially four stages in the prior art blow-molding process, summarized below:

| 1. delay | 0.4 secs | |
|---|---|---|
| 2. pre-blow | 0.2 | 100–150 psi |
| 3. high pressure blow | 5.0 | 550–600 |
| 4. rapid exhaust | 0.3 | |

Figure 3:
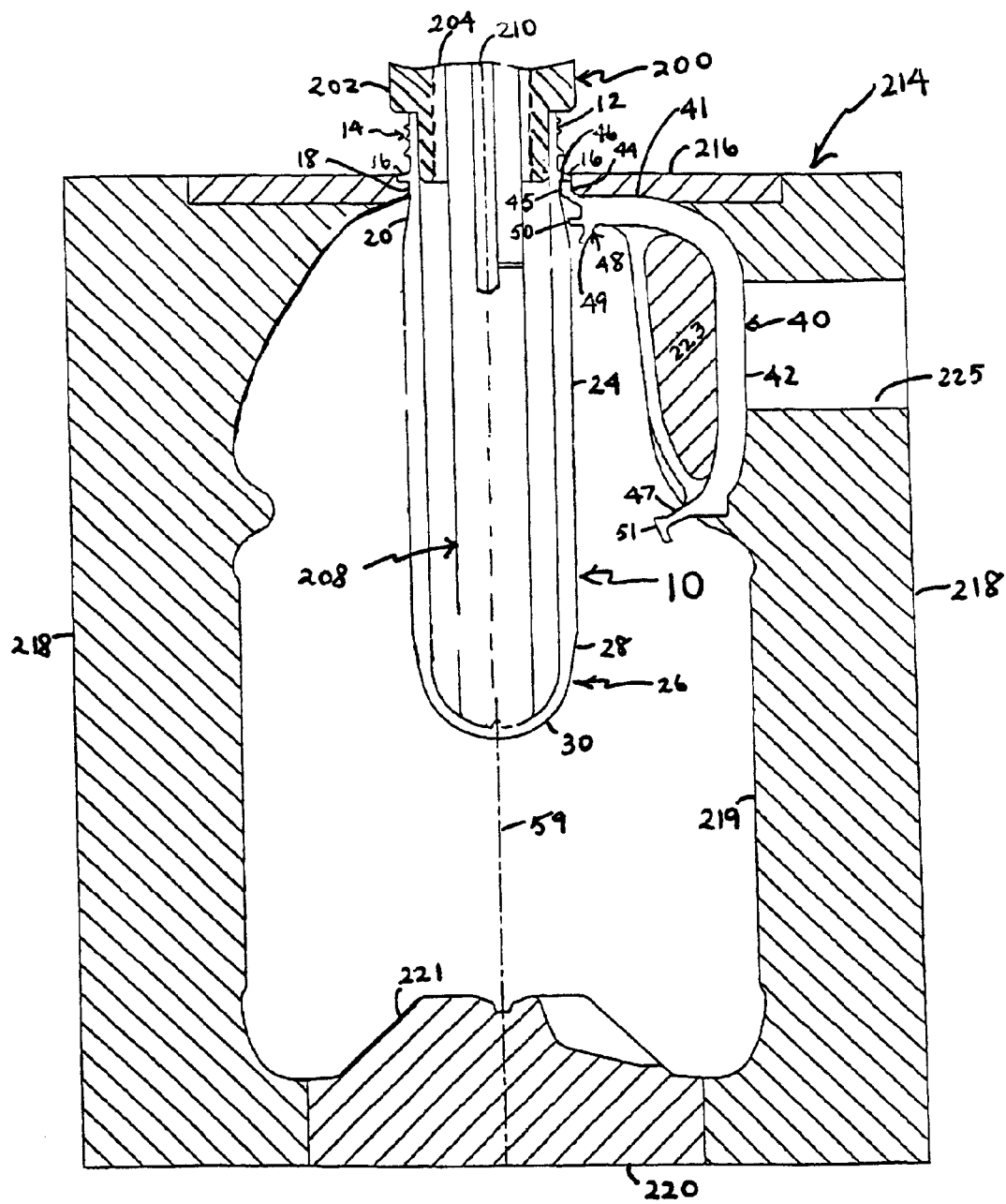
FIG. 3 is a cross-sectional view of a blow mold with a preform and handle positioned therein at the start of the blow-molding process.

At time "zero" on the X axis, a preform and handle have been positioned in the blow mold and the blow mold cavity is closed. Next, during a first delay stage of 0.4 seconds, a stretch rod positioned inside the preform (such as shown in FIG. 3) is moved downwardly. This causes axial stretching of the preform, where the preform is at a temperature within the biaxial orientation temperature range for PET. During a second optional pre-blow stage of the process, beginning at 0.4 seconds and lasting 0.2 seconds, low-pressure air is supplied around the stretch rod and within the preform, such that the air pressure within the preform begins to slowly rise and the preform begins to radially expand. The stretch rod continues its downward descent during this second pre-blow stage. At 0.6 seconds in the process, the end of the pre-blow stage, the stretch rod has reached its lowest position where the tip of the stretch rod is holding the central bottom portion of the preform against the center of the blow mold base. This helps ensure centering and even expansion of the preform into the container. The preform is now partially expanded and has an internal air pressure of 100 to 150 psi.

The process now enters a third stage, the high-pressure blow, at 0.6 seconds. A supply of high-pressure air within the preform is increased so that the preform very rapidly radially expands to the final container dimensions. It is then held against the walls of the mold cavity by the high pressure within the cavity. This rapid expansion occurs on the order of 0.2 seconds and the internal pressure reaches 550 to 600 psi. This pressure is held for about five seconds, during which the fully expanded container is held in contact with the warm walls of the blow mold cavity, in order to thermally condition the container. This thermal conditioning increases the amount of crystallization of the PET so as to provide thermal stability when the container is hot-filled. The stretch rod remains in its lowermost position holding the center of the container against the center of the blow mold base.

In a fourth stage of the process, beginning at about 5.6 seconds, there is a rapid exhaust of air from within the blow-molded container, over a period on the order of 0.3 seconds. At the same time, the stretch rod is contracted upwardly, returning to its uppermost position. At the end of the fourth stage, the blow mold cavity can be opened and the container removed from the mold.

Figure 2:
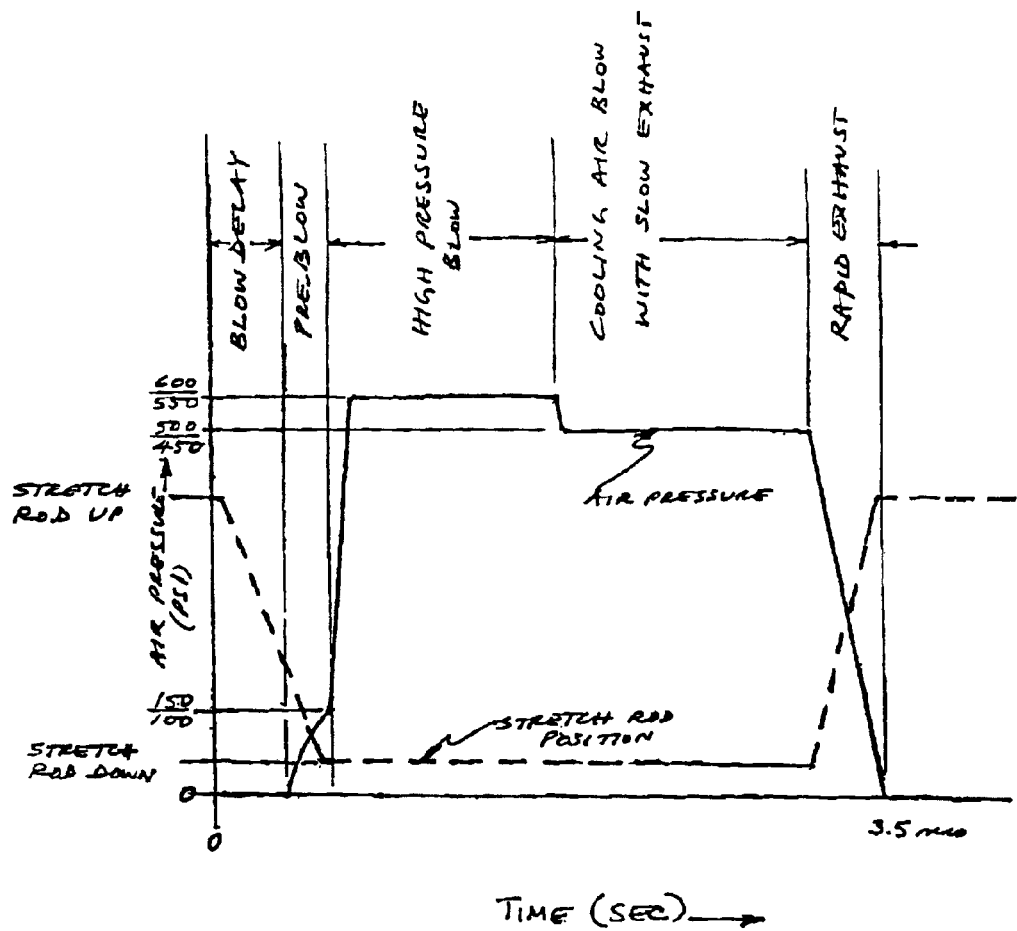
FIG. 2 is a graph of air pressure and stretch rod position on the Y axis, versus time on the X axis, for one embodiment of a blow-molding process of the present invention, showing the cooling air blow with slow exhaust step.

The blow-molding process of the present invention will now be described with reference to FIGS. 2–5. FIG. 2 shows five stages of the present embodiment with respect to air pressure and stretch rod position over time, as follows:

| 1. delay | 0.4 secs | |
|---|---|---|
| 2. pre-blow | 0.2 | 100–150 psi |
| 3. high pressure blow | 1.2 | 550–600 |
| 4. cooling air blow | 1.4 | 450–500 |
| 5. rapid exhaust | 0.3 | |

Figure 4:
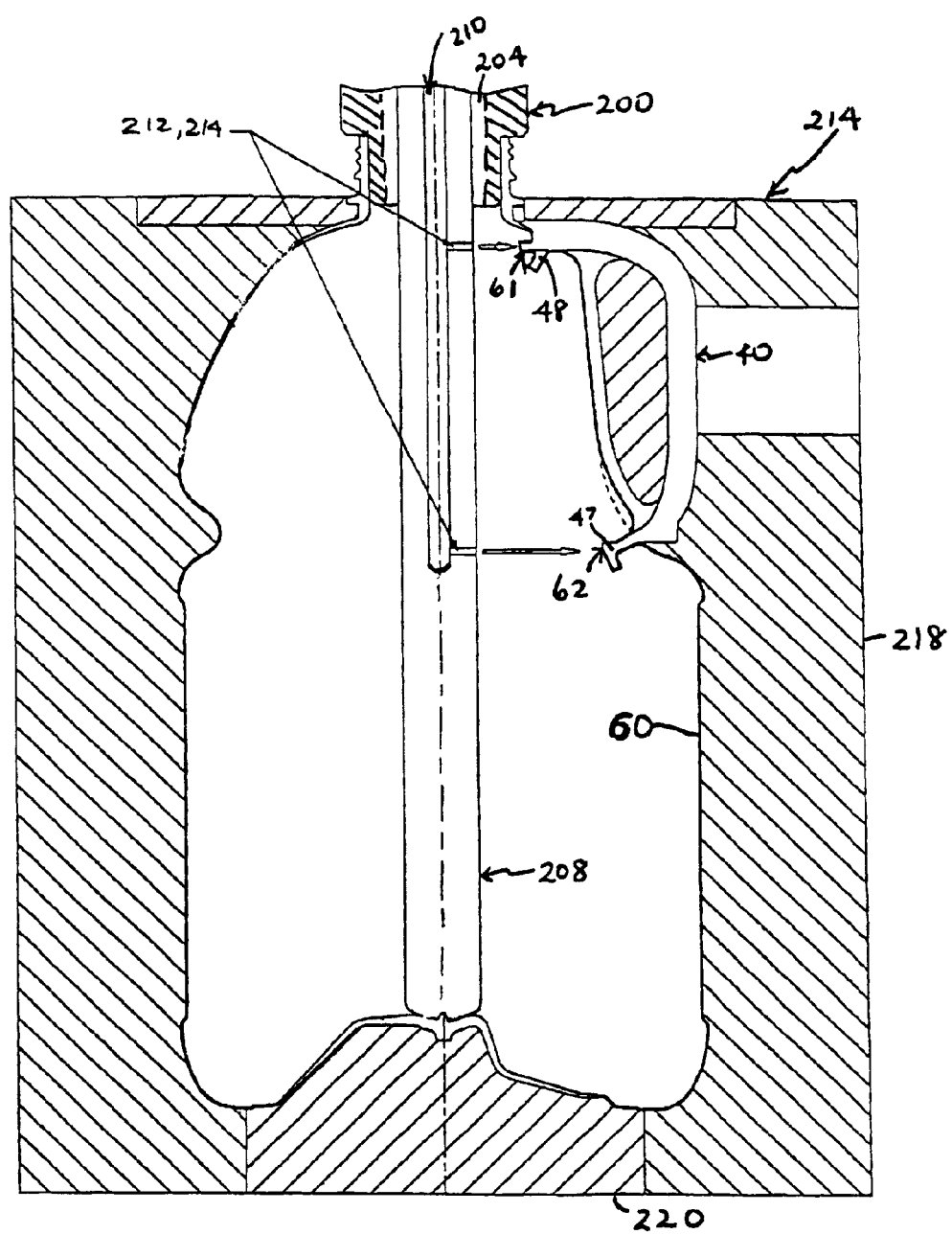
FIG. 4 is a cross-sectional view of the blow mold, similar to FIG. 3 but later in the process wherein the preform has been expanded to form the container and cooling air is directed out of ports on the stretch rod toward the container engagement portions with the handle.
Figure 5:
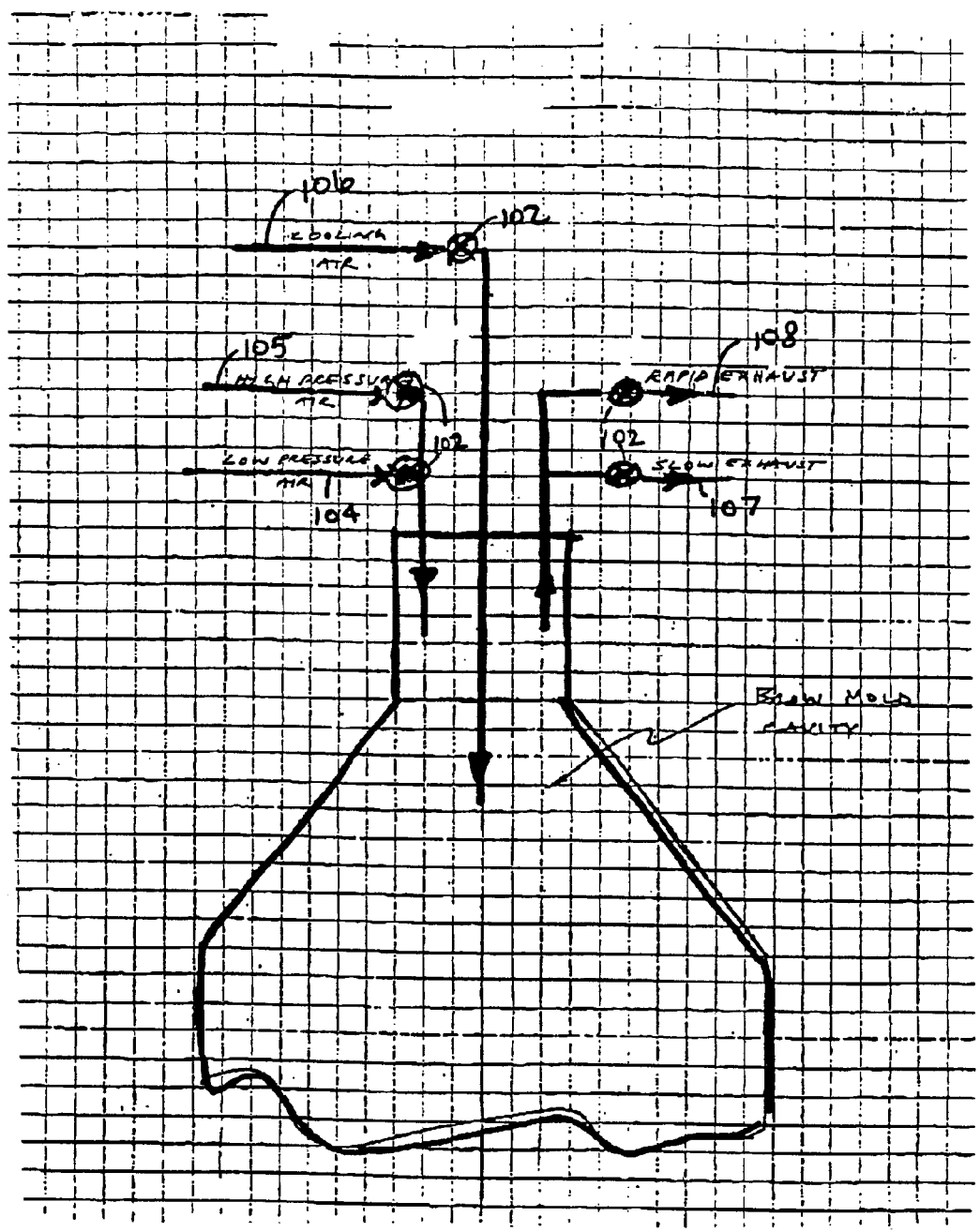
FIG. 5 is an air circuit diagram with three air supply and two air exhaust lines as utilized in this embodiment of the blow-molding process.

FIG. 3 shows the preform and handle in the blow mold cavity during the first stage of the process, and FIG. 4 shows the container and handle within the blow mold during the fourth stage wherein cooling air is directed to select portions of the container engaging the handle. FIG. 5 is a schematic illustration of three air supply lines and two exhaust lines for accomplishing this embodiment of the blow-molding process.

At the beginning of the blow-molding process, designated as time "zero" in FIG. 2, a preform and separate handle are positioned within the blow-molding cavity as shown in FIG. 3. The preform 10 includes an uppermost neck finish 12 with external threads 14 and a flange 16 at the bottom end of the neck finish. Below the neck finish there is a short cylindrical transition (neck finish-to-body) section 18, followed by a tapered shoulder or dome-forming portion 20 of increasing thickness. Below this is the panel-forming section 24 of the preform, which is substantially cylindrical and of substantially even thickness. At the bottom there is a closed base-forming section 26 having an upper tapered section 28 decreasing in wall thickness and a lower generally hemispherical central bottom portion 30. The preform of this embodiment is designed in terms of wall thickness, length, width, etc., for making a one-gallon hot-fillable container in accordance with the dimensions defined by the blow-molding cavity. The preform is of a single material and layer, and is made of commercially available PET having an intrinsic viscosity of about 0.80.

As shown in FIG. 3, the preform 10 is positioned in a blow mold unit 214 with a blow nozzle assembly 200 and stretch rod 208 in place for the start of the blow process. In FIG. 3, the stretch rod 208 has already been extended down into the preform (within the initial delay stage). The blow nozzle assembly includes a stuffer (plug) 202 which engages the neck finish of the preform and has an annular bore 204 for supplying fluid pressure to the interior of the preform. The blow nozzle assembly further includes a pressure relief valve (not shown) for controlling the fluid pressure within the preform during the various expansion steps. The movable stretch rod 208 enhances uniform expansion of the preform. The mold unit 214 includes a neck plate 216 which engages the flange 16 just below the neck finish on the preform. An upper mold body 218 has an inner surface 219 for forming the sidewall (upper dome, panel and outer base) of the container. A lower mold body 220 has an inner surface 221 for forming the central base of the container. The mold portions 216, 218 and 220 are kept at various temperatures to ensure appropriate thermal conditioning of the various portions of the container.

Also positioned within the blow mold is a handle 40. The handle is transferred into the blow mold by a transfer arm (not shown but positionable within aperture 225 in the left-hand upper mold body 218). The handle is held in place by handle-locating section 223. The handle has an upper end 41 with a support platform 44 which includes an annular top flat surface 46, and an annular curved inner surface 45 having a radius about the same as that of an outer wall of the transition portion 18 of the preform, located immediately below the flange 16. An upper retaining portion 48 is provided, spaced beneath the support platform 44, and includes a pair of vertically divergent tabs 49, 50 extending toward the longitudinal axis 59 of the preform, container and mold cavity. As later described, blow molding of the preform causes the plastic material of a portion of the preform wall to be molded about the upper retaining member 48 in order to hold the upper end 41 of the handle against the underside of the flange 16. The specific retaining member 48 shown herein is by way of example only; various other attachment members of differing shape, size and location can be utilized as well.

At a lower end 47 of the handle, below a central connecting portion 42, is a lower retaining member 51. Member 51 will be incorporated into a lower portion of the container dome by blow-molding of the preform around the lower retaining member 51. Similar to the upper handle retaining portion 48, the lower retaining portion 51 has a diverging distal end 51 in order to secure the handle to the container. Again, this is by way of example only and not limiting.

At the start of the blow-molding process, the preform 10 is generally hot, e.g., reheated to be within the orientation temperature range of PET, except for the cold neck finish 12. The preform will cool as it expands in the mold, and the mold sections 216, 218 and 220 are kept at different temperatures to control the percent crystallinity in different portions of the expanded container. The neck plate 216 engaging the neck finish is generally kept at, e.g., 100° F., the upper mold body 218 forming the sidewall is kept warm, e.g., 190° F., and the lower mold body 220 forming the base of the container is kept cooler, e.g., 50° F. The expanded shoulder (dome) and panel sections of the container thus achieve a substantially higher crystallinity level than the base, which optimizes thermal stability in this hot-fillable container.

As previously indicated, a hot-fillable container is described in U.S. Pat. No. 4,863,046 to Collette et al., issued Sep. 5, 1989, which is hereby incorporated by reference in its entirety. Hot fill containers typically must withstand elevated temperatures on the order of 180–190° F. (the product filling temperature) and positive internal pressures on the order of 2–5 psi (the filling line pressure) without substantial deformation, i.e., a volume change of no greater than about one percent.

Returning to FIG. 2, the blow-molding cavity is closed (at time "zero") and the blow-molding cycle begins with an initial short delay stage. As previously described, the stretch rod is extended axially downwardly (along vertical axis 59) to axially extend the preform during this stage. During a second pre-blow stage, the stretch rod continues its downward descent while an initial low pressure air supply gradually increases the pressure within the preform up to about 100 to 150 psi, over a period of 0.2 seconds. At 0.6 seconds, a third high-pressure blow stage begins, with an initial rapid expansion of the container up to an internal pressure of 550 to 600 psi. The container is now fully expanded and held in contact with the cavity wall for about 1.2 seconds. Then, in accordance with the present invention, the pressure within the container is reduced to about 450 to 500 psi, and held for a period of about 1.4 seconds, by supplying a cooling air flow with a slow exhaust. As shown in FIG. 4, this cooling air is supplied via a hollow central axial bore 210 and two air ports 212, 214 within the stretch rod 208; the cooling air is directed by the ports toward the two portions 61, 62 of container 60 which have formed around and tightly engage the upper and low retaining portions 48, 47 of the handle. This enables preferential cooling of these two portions 61, 62 of the container. This is particularly useful because these two portions of the container have not been in contact with the mold cavity walls, and thus are generally at a higher temperature than the other portions of the container wall, i.e., the cavity walls preferentially cool those portions of the container wall in contact with the cavity walls. During this fourth cooling air blow stage, the container is maintained in contact with the cavity walls but there is some air flow allowed in order to cool the upper and lower handle attachment portions 61, 62, based on the slow exhaust of air from within the container. Again, this enables preferential cooling of these two portions of the container.

In the final rapid exhaust stage, beginning at about 3.2 seconds and lasting for about 0.3 seconds, air pressure within the container is rapidly reduced to zero (ambient) while the stretch rod contracts to its uppermost position. The rapid exhaust stage is over at 3.5 seconds and then the blow mold cavity can be opened and the container removed from the cavity.

FIG. 5 is an air circuit schematic showing three air supply lines and two exhaust lines for accomplishing the blow-molding process as described herein. In this embodiment, each supply or exhaust line is provided with a valve 102 which is timed to open and close during the various portions of the cycle. During the initial blow delay stage, all five air lines 104–108 are closed. During the second pre-blow stage, the low-pressure air supply line 104 is open to gradually increase the pressure within the preform and provide an initial radial expansion of the preform. During the third stage of the process, all four air lines are closed except for the high-pressure-air supply line 105 which supplies high-pressure air to rapidly expand the preform to the final container dimensions, and hold it in contact with the cavity walls for a period of 1.2 seconds. During the fourth cooling air-blow stage, all lines are closed except for the cooling air line 106 which supplies high-pressure air to the two ports 212, 214 in the stretch rod, and the slow exhaust line 107 which is open at the same time to exhaust some of the high-pressure air in order to provide an air flow about the two portions 61, 62 of the container being cooled by the cooling air. Finally, during a fifth rapid exhaust stage of the cycle, all air lines are closed except for the rapid exhaust line 108 which is opened at the end of the cooling stage in order to reduce the pressure within the container down to zero (ambient), before opening the mold.

During the fourth cooling air blow stage, it is desirable to provide some air flow in order to cool the two portions of the container around the upper and lower handle attachment members, but it is undesirable to drop the pressure within the container substantially because the container would then pull away from the cavity wall. This would substantially reduce the cooling occurring at the cavity walls as well as the thermal conditioning required to achieve the desired thermal stability in the hot-fillable container. Also, it would be undesirable to provide a large air flow by significantly exhausting air from the container as this would use up large quantities of the high-pressure air, which is a relatively expensive component of the process.

In accordance with the invention, there is achieved an overall reduction in the blow-molding process time, as well as an improved anchoring of the handle to the container. The reduction in blow-molding process time is quite significant in the present embodiment, which is seen by comparing FIGS. 1 and 2. In the prior art process, the blow-molding process time was 5.9 seconds, whereas in the embodiment of the present invention, the blow-molding process time has been reduced to 3.5 seconds. This is a very significant cost savings in the manufacture of the container.

In an alternative embodiment, the low pressure pre-blow stage is eliminated. This would eliminate the need for the low pressure air supply line. Generally, however, the pre-blow stage is preferred because it improves the material distribution in the container.

In another embodiment, a separate source of cooling air can be eliminated; instead, the high pressure source is utilized during the fourth cooling air blow stage, while opening of the slow exhaust line achieves the desired reduction in air pressure and air flow.

In yet another embodiment, additional cooling of the handle can be achieved by circulating cooling media in the handle locating section 223 of the blow mold.

In other embodiments, as previously indicated, the retaining members on the handle may be of different size, shape and location. In general, the goal is to achieve a secure connection between the container wall and retaining members, typically by allowing the container wall to conform to the external contour of the retaining member, and also to reduce post-mold deformation at these portions of the container wall by adequately cooling down the wall material to its rigid state within the blow mold.

The container is not limited to either monolayer containers or PET containers. Various other polymer resins can be used such as polyesters (in addition to PET), polyolefins, polycarbonates, nitrites, and copolymers of the same. Polyethylene naphthalate (PEN) is another useful polymer with physical properties similar to PET, but provides an improvement in barrier property and thermal performance. The container may either be a monolayer or multilayer construction, including layers of for example an oxygen barrier material, a layer of reprocessed scrap material, or other high-performance materials.

The container may not be a hot-fillable container, but rather can be a carbonated beverage container, juice container, ketchup container, liquid detergent container, etc.

The handle may be formed by any well-known technique, such as injection molding. It is not necessary that it is made from the same material as the container. It may be formed from a plastic such as high-density polyethylene, polypropylene, PET, recycled PET, glass reinforced PET or glass reinforced high-density polyethylene.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. In a method of in-mold handle attachment wherein a portion of a blow-molded container is formed about a retaining member on the handle during blow-molding, the improvement comprising:

after forming the container portion about the retaining member, directing a cooling medium at the location of the container portion in order to accelerate the cooling rate at the portion.

2. The method of claim 1, wherein the cooling medium is air directed at the portion from within the blow-molded container.

3. The method of claim 1, wherein the blow-molded container is axially stretched by a stretch rod and wherein the stretch rod includes at least one port for directing the cooling medium at the container portion.

4. The method of claim 1, wherein the cooling medium is directed at the container portion while the container is held against a mold cavity.

5. The method of claim 1, wherein a blow-molding step includes injecting an expansion medium to form the blow-molded container and hold the container in contact with a mold cavity, followed by injecting the cooling medium and enabling a partial exhaust to promote flow of the cooling medium at the container portion while maintaining the container in contact with the mold cavity.

6. The method of claim 5, wherein the step of applying the cooling medium and partial exhaust is followed by applying a rapid exhaust prior to removal of the container from the mold cavity.

7. An improved method of in-mold handle attachment, wherein a portion of a blow-molded container is formed about a retaining member on the handle during blow-molding in a mold cavity, the improvement comprising:

reducing the time for cooling the blow-molded container in the mold cavity by directing a cooling medium at the container portion in order to accelerate the rate at which the container portion is cooled.

8. A method of in-mold handle attachment, including steps of:

expanding a preform in a blow mold to form a blow-molded container, wherein a portion of the blow-molded container is formed about a handle during blow-molding; and directing a cooling medium at the location of the container portion.

9. The method of claim 8, wherein the directing step accelerates the cooling rate of the container portion about the handle.

10. The method of claim 8, wherein the cooling medium is directed at the container portion while the container is held in contact with a mold cavity.

11. The method of claim 8, wherein the expanding step includes stretching with a stretch rod, and wherein the stretch rod includes at least one port for directing the cooling medium at the container portion.

12. The method of claim 8, wherein a partial exhaust is provided for promoting flow of the cooling medium.

13. The method of claim 12, wherein directing the cooling medium and applying the partial exhaust is followed by applying a rapid exhaust.

14. The method of claim 8, wherein the directing step reduces the time for cooling the blow-molded container in the blow mold.

15. The method of claim 8, wherein a high pressure source supplies the cooling medium.

16. The method of claim 8, wherein a high pressure source supplies an expansion medium for the expanding step and the cooling medium for the directing step.

17. The method of claim 8, wherein a low pressure source supplies an expansion medium during a preliminary expansion step.

18. The method of claim, 8, wherein a slow exhaust is provided to promote flow of the cooling medium and a rapid exhaust is provided for exhausting an expansion medium.

19. The method of 8, wherein the cooling medium is directed at the container portion from within the blow-molded container.

20. The method of claim 8, wherein the expanding step includes stretching the preform with a stretch rod and injecting an expansion medium to form the blow-molded container and the directing step includes holding the container in contact with a mold cavity and injecting the cooling medium through at least one port in the stretch rod.

21. The method of claim 20, wherein the directing step further includes providing a partial exhaust to promote flow of the cooling medium at the container portion while maintaining the container in contact with the mold cavity.

22. The method of claim 21, wherein the step of applying the cooling medium and partial exhaust is followed by applying a rapid exhaust prior to removal of the container from the mold cavity.

* * * * *